United States Patent [19]

Yamada et al.

[11] Patent Number: 5,192,045
[45] Date of Patent: Mar. 9, 1993

[54] SEAT SLIDE ADJUSTER FOR VEHICLES

[75] Inventors: Yukifumi Yamada; Kenichiro Akizuki, both of Toyota, Japan

[73] Assignees: Aisin Seiki Kabushiki Kaisha; Toyota Jidosha Kabushiki Kaisha, Japan

[21] Appl. No.: 822,046

[22] Filed: Jan. 17, 1992

[30] Foreign Application Priority Data

Jan. 21, 1990 [JP] Japan .................................. 2-19190

[51] Int. Cl.⁵ .......................................... F16M 13/00
[52] U.S. Cl. .................................... 248/430; 297/344
[58] Field of Search ............... 248/429, 430, 419, 420, 248/393, 424; 297/346, 322, 329, 344, 473; 296/65.1; 384/50, 47

[56] References Cited

U.S. PATENT DOCUMENTS

| | | | |
|---|---|---|---|
| 3,926,397 | 12/1975 | Hunwicks | 248/430 |
| 4,621,784 | 11/1986 | Kaesling et al. | 297/344 X |
| 4,666,209 | 5/1987 | Kazaoka et al. | 248/429 X |
| 5,028,028 | 7/1991 | Yamada et al. | 248/430 |
| 5,046,698 | 9/1991 | Venier | 248/430 |

FOREIGN PATENT DOCUMENTS

| | | |
|---|---|---|
| 0076041A1 | 4/1983 | European Pat. Off. . |
| 3724758 | 2/1989 | Fed. Rep. of Germany ...... 248/430 |
| 55-26010 | 7/1980 | Japan . |
| 62-238136 | 10/1987 | Japan . |
| 1524952 | 9/1978 | United Kingdom . |
| 2188543 | 10/1987 | United Kingdom ................ 248/429 |

Primary Examiner—Karen J. Chotkowski
Attorney, Agent, or Firm—Finnegan, Henderson, Farabow, Garrett & Dunner

[57] ABSTRACT

A seat slide adjuster includes a lower rail fixed to a vehicle floor and an upper rail slidable with respect to the upper rail. Each portions of respective rais are integrally formed so that thickness of each portions of the rails are easily selected to with stand a high load in collision. Oblique portions of the rails which are opposed to each other will be brought into contact to receive the high load.

8 Claims, 5 Drawing Sheets

SEAT SLIDE ADJUSTER FOR VEHICLES

BACKGROUND OF THE INVENTION

1. Field of the Invention

This invention relates to a seat slide adjuster for vehicles, particularly a seat slide adjuster having a bracket for attachment to a seat belt on an upper rail slidable with respect to a lower rail fixed to a vehicle body.

2. Descrption of the Prior Art

Recently, a local regulation requests to install a seat belt for the sake of safety so that an easy handling of the seat belt is desired. In the meantime, it has been normal to slide a seat in fore and aft direction to establish a comfortable attitude of the seated individual. In this case, when the ends of the seat belt are fastened to the vehicle body, the arrangement of the seat belt is substantially disturbed by sliding movement of the seat in retain to the vehicle body. When at least one end of the seat belt is fastened to a bracket of a seat slide adjuster allowing the free sliding movement of the seat, a proper tension of the belt is kept while the seat position is adjusted.

To enable the seat to be adjustable in the fore and aft direction and at least one end of the seat belt to be fastened to the seat slide adjuster, a seat reclining hinge pin and a seat belt anchorage are secured to the bracket of the seat slide adjuster so that a high stripping load is applied to an upper rail having the bracket for attachment to the seat belt in a collision and the upper rail is torn away from a lower rail fixed to the vehicle body or floor. The local regulation required to mount the seat slide adjuster of a high strength to withstand such the high stripping load in the collision.

To prevent the upper rail from being torn away from the lower rail when the uppwardly directed stripping load is received by the upper rail, in a conventional seat slide adjuster the configuration of the rail is to be improved and the thickness of the rail is to be increased.

For example, the specification of EP076041, the specification of British Patent No. 1524952 or the specification of Japanese Patent Application Laid-Open (Kokai) No. 62-238136 discloses an improved seat slide adjuster, respectively. A conventional or typical attempt to improve the strength of a seat slide adjuster is illustrated in FIGS. 6, 7 and 8. The seat slide adjuster has a low rail 2 fixed through fittings 10, 11 to a vehicle floor and an upper rail 1 to which a seat cushion frame is attached. The upper rail 1 is located in such a manner that sliding movement of the upper rail 1 relative to the lower rail 2 in the longitudinal direction is possible. A hinge plate 4 is secured to a rear end of the upper rail 1 and has a seat reclining hinge pin 5 for holding the seat cushion and a seat belt anchorage 3.

As shown in FIGS. 7 and 8, the upper rail 1 has a generally inverted T-shaped cross section and comprises L-shaped metal plates opposed each other. A horizontal surface 24 of each metal plate is provided with a vertical flange 15. The lower rail 2 has a generally C-shaped cross section and horizontal surfaces 16 thereof are provided with downwardly extendings flanges 17, respectively. Each upper surface 16 is opposed to each lower surface 24 in spaced relation and each vertical flange 15 is opposed to each downward flange 17 in spaced relation to define a track for balls 13. Rollers 14 are located between a base portion 20 and the lower surfaces 24.

Since a heavy load is applied to the seat belt anchorage 3, bending stresses are generated at corner portions 18, 19 so that a reinforcement thereof is necessary. In an example of FIG. 8, reinforcement plates 29, 30 are attached to the lower surfaces 24 and the corners 19. This will be heavy in weight and increase the number of parts.

For holding the upper rail 1 relative to the lower rail 2 after adjustment of fore and aft position of the seat a lack mechanism 28 is used.

SUMMARY OF THE INVENTION

Accordingly, an object of the present invention is to provide a seat slide adjuster for vehicles which provides a large stripping resistance while at the same eliminating the above-described disadvantages encountered in the prior art.

Another object of the present invention is to provide a vehicle seat slide adjuster having a small height and width-wise dimensions and a small amount of parts without detracting from the strength of rails.

According to the present invention, the foregoing objects are attained by providing a vehicle seat slide adjuster of the new type having a lower rail to be fixed to a vehicle body and an upper rail to which seat cushion is attached, the upper rail being slidable with respect to the lower rail. The lower rail has a horizontal base portion, upwardly extending side portions from both ends of the horizontal base portion, horizontal upper portions as turned horizontally inwardly from both ends of the side portions to define an opening, and oblique portions extending outwardly from both ends of the upper portions. The upper rail has a vertical base portion upwardly projecting through the opening or slit of the lower rail, a lower portion horizontal extending from the lower end of the vertical base portion, the lower portion being parallel with the base portion of the lower rail in spaced relation, and oblique portions inwardly upwardly extending from ends of the lower portion. Balls are disposed between corner portions, as formed by the side portions and the upper portion of the lower rail, and the oblique portions of the upper rail. Each portions of the lower rail and the upper rail are integrated by extrusion process of an aluminum-based alloy.

According to the present invention, in the case of a head-on collision and application of a large stripping load on a belt anchorage, the oblique portions of the upper rail are brought into contact with the oblique portion of the lower rail of which contact width or lengthes are adequate to withstand such the load, and only these oblique portions are resiliently deformed and damage to the Balls is nothing so that the upper rail will slide smoothly with respect to the lower rail at any time.

The extrusion process of the aluminum-based alloy enables the rails to selectively choose its cross-section dimensions. For example, a thickness of each corner portion will become greater and the rails will exhibit a low section modulus and a high rigidity against a bending action.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
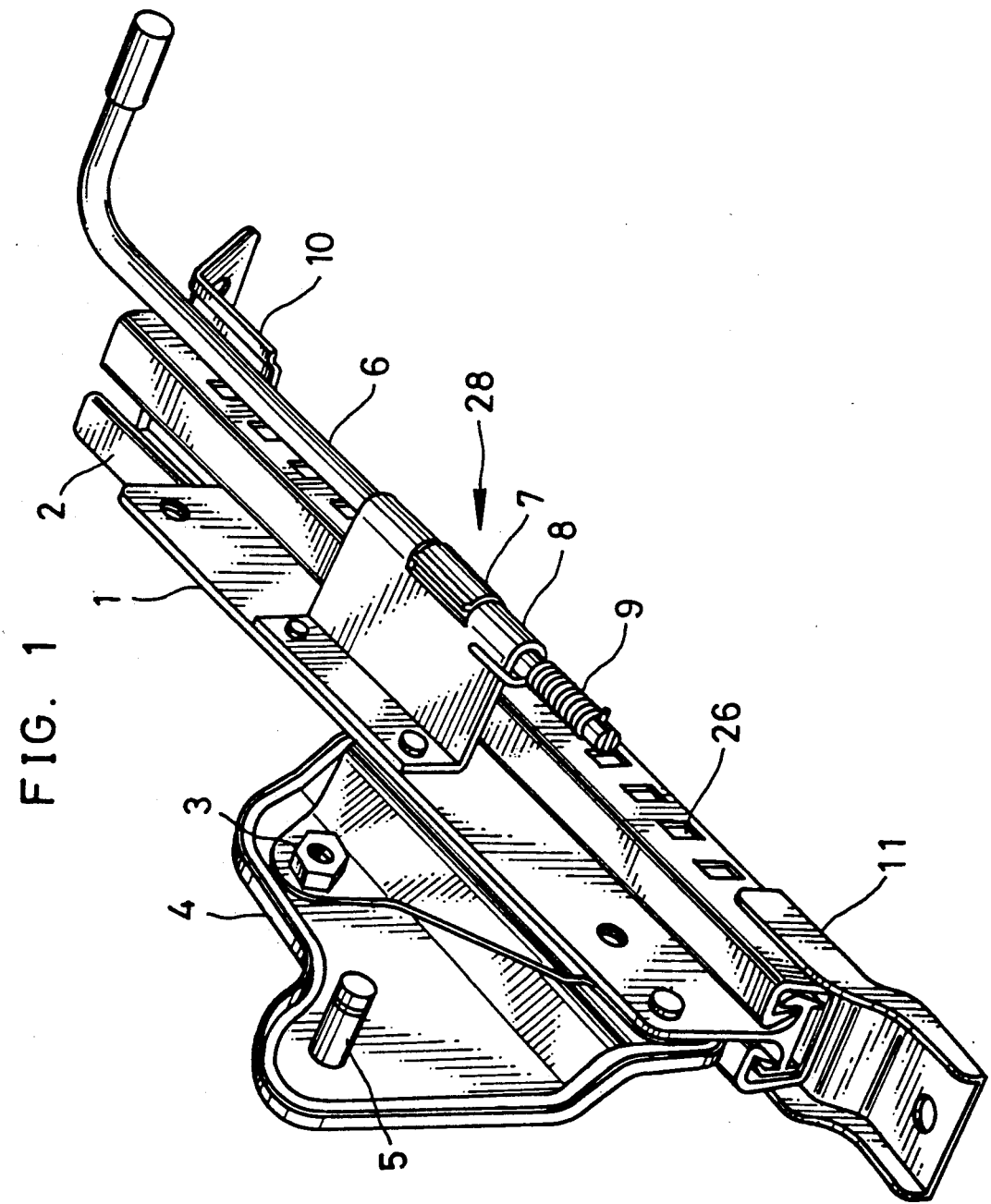
FIG. 1 is a perspective view illustrating a seat slide adjuster for a vehicle according to the present invention.
Figure 2:
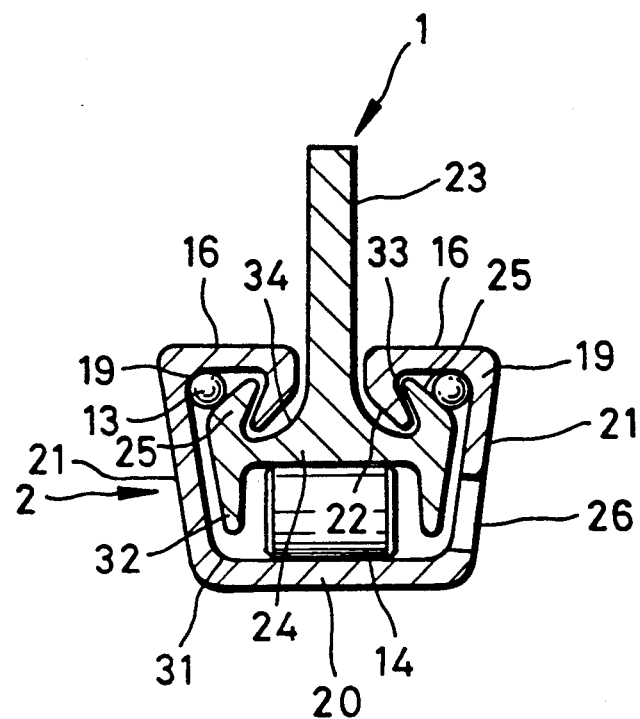
FIG. 2 is a sectional view of rails as used in FIG. 1.

Referrence will be made to FIGS. 1-5 to describe a seat slide adjuster embodying the present invention.

The seat slide adjuster of the present invention includes a lower rail 2 to be fixed through brackets 10, 11 to a vehicle floor (not shown) and an upper rail 1 slidable with respect to the lower rail 2. The upper rail 2 includes a hinge plate 4 with a belt anchorage 5 and a seat reclining hinge 5. The hinge plate 4 extends upwardly from the upper rail 1 and is attached to a projection of the upper rail 1. The upper rail 1 will be locked against the lower rail 2 at a selected position by means of a lock mechanism 28. Release of the lock mechanism 28 enables the upper rail 1 to be slide with respect to the lower rail 2 in a longitudinal direction.

A seat cushion (not shown) is attached to the upper rail 1. The lower rail 2 includes a horizontal base portion 24, upwardly extending side portions 21, 21 from both ends of the base portion 24, horizontal upper portion 16, 16 as turned horizontally inwardly from both ends of the side portions 21, 21, and oblique portions 22, 22 extending outwardly from both ends of the upper portions 16, 16.

The upper rail 1 has a vertical base portion 23 upwardly projecting through a slit or opening delimited between the upper portions 16, 16 of the lower rail 2, a lower portion 24 horizontally extending from a lower end of the vertical base portion 23, the lower portion 24 being parallel to the base portion 20 of the lower rail 2 in spaced relation, oblique portions 25, 25 inwardly upwardly extending from ends of the lower portion 24, and vertical portions 32 provided on ends of the lower portion 24. Balls 13 are disposed in spaces between corner portions 19, 19 of the lower rail 2 and the oblique portions 25, 25 of the upper rail 1. Roller 14 is arranged in a space formed by the base portion 20 of the lower rail 2 and the lower portion 24 of the upper rail 1 to contact the surfaces of these portions so that the sliding friction is decreased.

Figure 3:
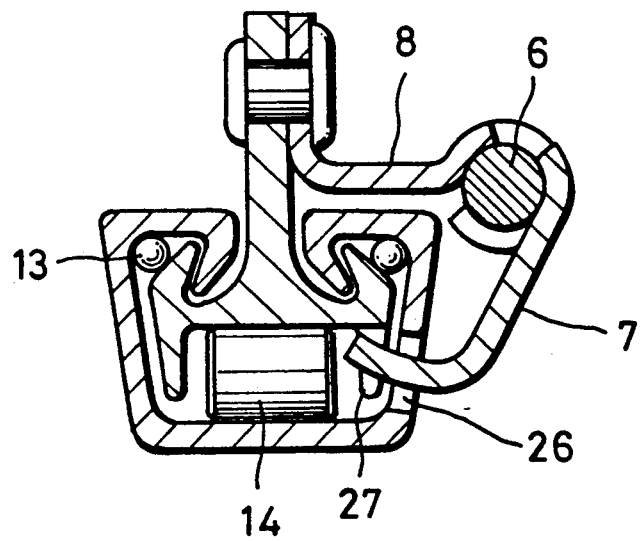
FIG. 3 is a sectional view of the rails and lock-mechanism.
Figure 4:
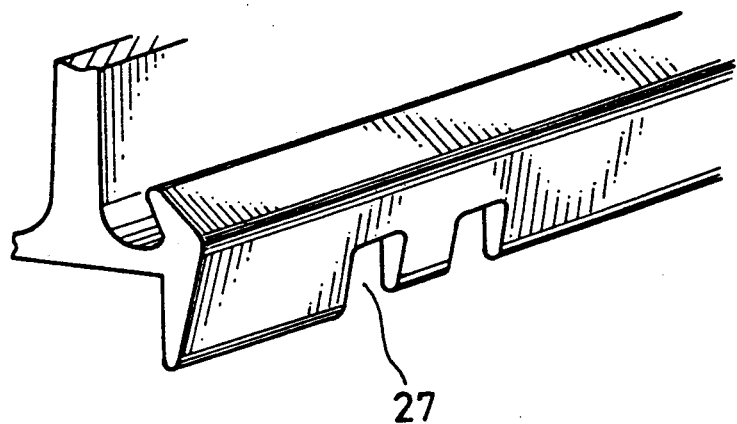
FIG. 4 is a perspective view showing notches engageable with a trigger of the lock-mechanism.

The lock mechanism 28 includes a bracket 8 fixed to the base portion 23 of the upper rail 1, a lock release handle 6 manipulated by the seated passenger in an ordinal manner, a lock lever 7 brought into and out of engagement with one of holes 26, 27 of the rails 1, 2, and a spring 9 biasing the lock lever 7 in the lock alignment. In FIG. 3, when the release handle 6 is rotated in counterclock-wise direction against the biasing force of the spring 9, the lock lever 7 is out of the engagement with the holes 26, 27 so that a free slide movement of the upper rail 1 relative to the lower rail 2 is obtained.

When a large stripping load is applied on the belt anchorage 3 in a collision, the upper rail 1 is likely to be torn away from the lower rail 2. However, the oblique portions 25 of the upper rail 1 is brought into contact engagement with the oblique portions 22 of the lower rail 2 so that the large stripping load is received by these oblique portions 22, 25 to transmit the external force through the lower rail 2 to the vehicle body.

The rails 1, 2 are made of aluminum-based alloy, magnesium-based alloy or synthetic resin and manufactured by an extrusion process which enables every portions of the rails 1, 2 to be integrated. It is easy to select the dimensions of each portions of the rails 1, 2 to withstand the large stripping load. For example, the corner portions or the turned over portions of the rails are easily designed to be thickned to resist local deformations and also thin portions to which small load is received can be used to reduce the weight of the rails 1, 2. This will be useful in providing a low section modulus and equally distributing the external load to each portions of the rail 1, 2.

In the illustrated example, a cross portion 34 of the lower portion 24 and the base portion 23 is increased in thickness and the distal ends of the lower portion 24 is decreased gradually in thickness to form a tapered upper surface. The corner portions 19, 31, 33 are thickned so that the excessive bending moment as may be encountered in collision is received by the reinforced corner portions 19, 31, 33 and the reinforced cross portion 34.

The oblique portions 22, 25 of the rails 1, 2 are reduced in thickness at distal ends thereof to decrease the weight of the rails 1, 2, but without detracting from the strength of the rails.

Figure 5:
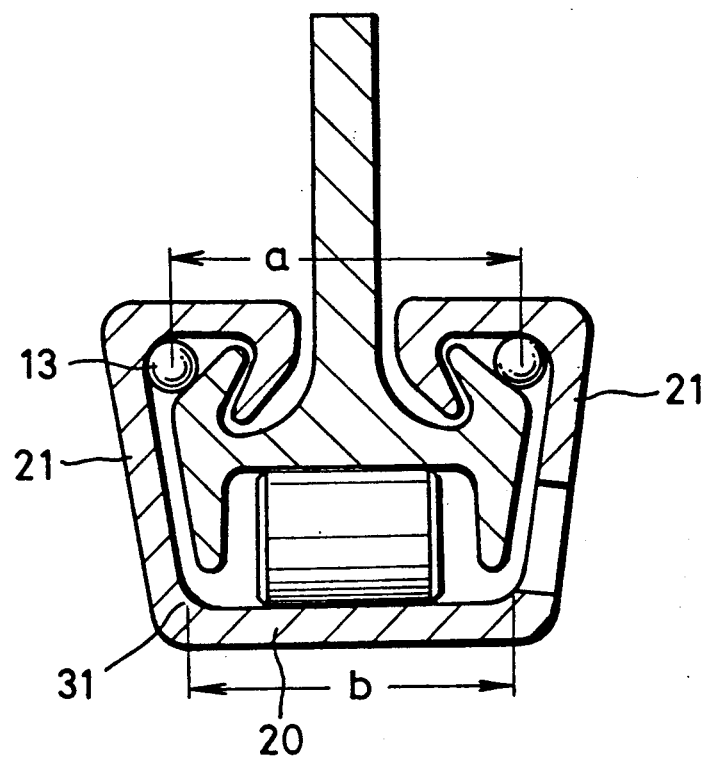
FIG. 5 is an enlarged cross-section of the rails, but showing dimensions of a lower portion of the lower rail and an space between the balls.
Figure 6:
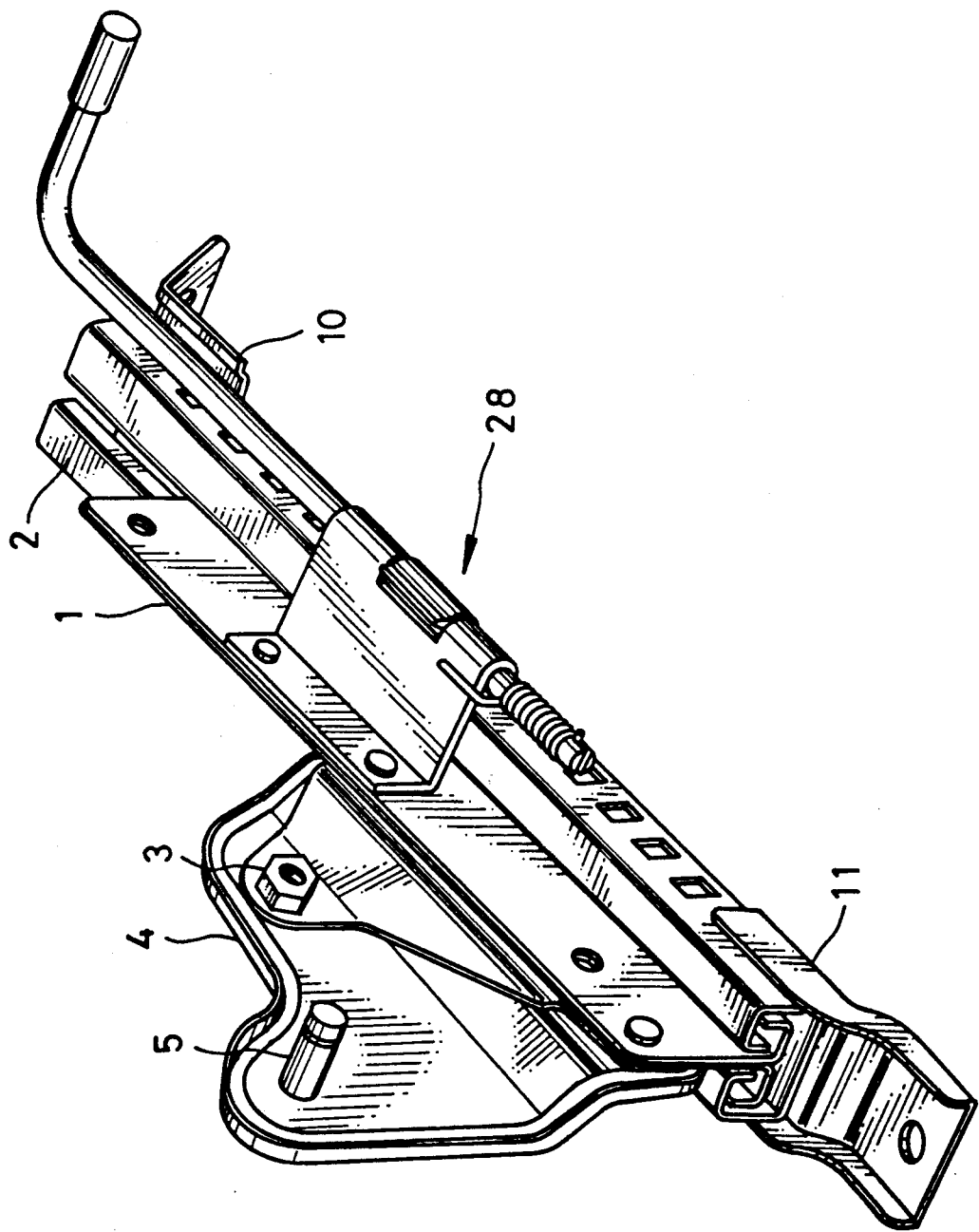
FIG. 6 is a perspective view of a seat slide adjuster according to the prior art.
Figure 7:
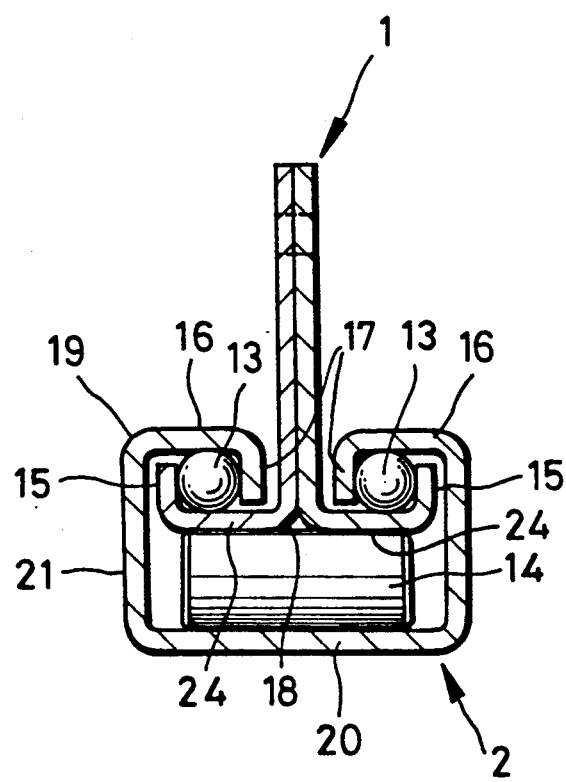
FIG. 7 is a sectional view of rails as used in FIG. 6.
Figure 8:
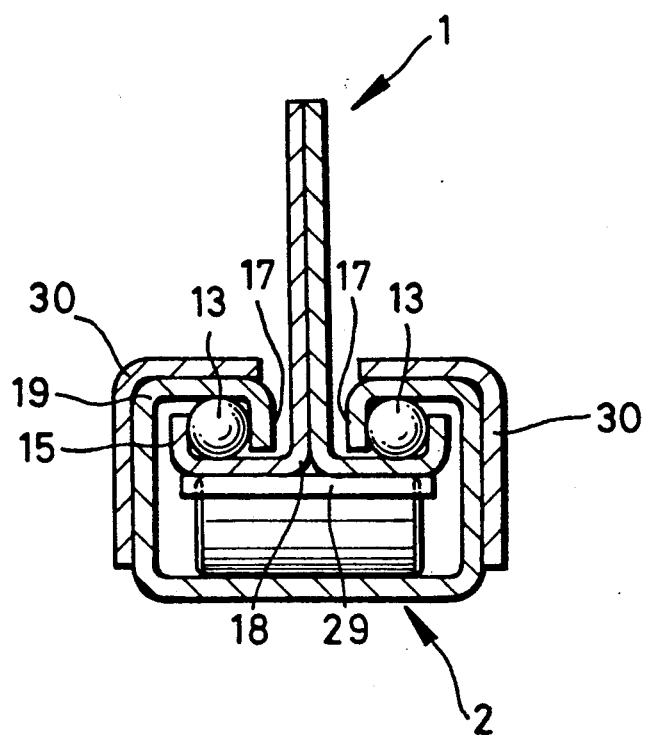
FIG. 8 is a sectional view of another rails of the prior art.

Refer to FIG. 5, a width dimension (b) of the base portion 20 is shorter than a dimension (a) delimited by centers of the opposed balls 13 so that the load transmitted through the balls 13 from the upper rails 1 to the lower rails 2 is applied directly to the corner portions 31 of the lower rail 2 and the bending moment at the corner portions 31 causes the slit or opening of the lower rail through which the vertical base portion 23 of the upper rail 1 extends to become narrow and the provide a high strength or a large resisting force.

The vertical portions 32 extending downwardly from the ends of the lower portions 24 of the lower rail 1 cause the inertia forces of the cross-section of the upper rail 1 to be increased and the rigidity of the upper rail 1 also to be increased.

The seat slide adjuster according to the present invention exhibits a large registing property against a high stripping load in a collision without decrease in strength, even if dimensions of each portions of rails are reduced.

As many apparently widely different embodiments of the present invention can be made without departing from the spirit and scope thereof, it is to be understood that the invention is not limited to the specific embodiments thereof except as defined in the appended claims.

What is claimed is:

1. A seat slide adjuster for a vehicle comprising:
    a lower rail fixable to a vehicle body;
    said lower rail including a horizontal base portion, and upwardly extending side portions from both ends of said horizontal base portion defining corner portions;

upper portions extending horizontally inwardly from both ends of said side portions to define an opening, and oblique portions extending outwardly from both ends of said upper portions;

an upper rail slidable with respect to said lower rail and having a bracket with a seat belt anchorage;

said upper rail including a vertical base portion projecting through said opening of said lower rail, a lower portion extending horizontally from a lower end of said vertical base portion and being parallel with said base portion of said lower rail, and oblique portions extending inwardly and upwardly from said lower portion; and balls positioned in spaces defined by the corner portions of said lower rails and the oblique portions of said upper rail.

2. The adjuster according to claim 1 wherein a cross portion formed by said vertical base portion and said lower portion of said upper rail is increased in thickness and distal ends of said lower portion are reduced in thickness.

3. The adjuster according to claim 1 wherein the corner portions formed by the base portion and the side portions of said lower rail, the corner portions formed by the side portions and the upper portions of said lower rail, and the corner portions formed by the upper portions and the oblique portions of said lower rail are increased in thickness.

4. The adjuster according to claim 1 wherein the oblique portions of said lower and upper rail have a taper at each end.

5. The adjuster according to claim 1 wherein the width of the base portion of said lower rail is less than a distance between the centers of the balls.

6. The adjuster according to claim 1 wherein the lower portions of said upper rail is provided with downwardly extending portions.

7. The adjuster according to claim 6 further including at least one roller located between the horizontal base portion of said lower rail and the lower portion of said upper rail.

8. The adjuster according to claim 1 wherein each portion of said rails is formed of an aluminum-based alloy.

* * * * *

UNITED STATES PATENT AND TRADEMARK OFFICE
CERTIFICATE OF CORRECTION

PATENT NO. : 5,192,045
DATED : March 9, 1993
INVENTOR(S) : Yukifumi YAMADA et al.

It is certified that error appears in the above-indentified patent and that said Letters Patent is hereby corrected as shown below:

TITLE PAGE

FOREIGN APPLICATION PRIORITY DATA, Front Page, change "Jan. 21, 1990" to --Jan. 21, 1991--.

ABSTRACT should read as shown below:

--ABSTRACT OF THE DISCLOSURE

A seat slide adjuster includes a lower rail fixable to a vehicle floor and an upper rail slidable with respect to the lower rail. Oblique portions of the rails which are opposed to each other will be brought into contact to receive a high load during a collision.--

Signed and Sealed this

Fourth Day of January, 1994

BRUCE LEHMAN

*Attest:*

*Attesting Officer*  Commissioner of Patents and Trademarks